United States Patent
Hsiao et al.

(10) Patent No.: US 9,350,262 B1
(45) Date of Patent: May 24, 2016

(54) SYNCHRONOUS RECTIFIER CONTROLLING MODULE AND METHOD FOR CONTROLLING A SYNCHRONOUS RECTIFIER

(71) Applicant: Chicony Power Technology Co., Ltd., New Taipei (TW)

(72) Inventors: Yung-Hung Hsiao, New Taipei (TW); Chih-Kuan Hu, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/705,594

(22) Filed: May 6, 2015

(51) Int. Cl.
*H02M 7/217* (2006.01)
*H02M 7/23* (2006.01)

(52) U.S. Cl.
CPC ..................................... *H02M 7/217* (2013.01)

(58) Field of Classification Search
CPC ..... H02M 3/335; H02M 7/217; H02M 7/219; H02M 7/23

USPC ..................... 363/21.06, 21.14, 127
See application file for complete search history.

(56) References Cited

U.S. PATENT DOCUMENTS 6,002,597 A * 12/1999 Rozman ............ H02M 3/33592 363/127

* cited by examiner

*Primary Examiner* — Gary L Laxton
(74) *Attorney, Agent, or Firm* — Muncy, Geissler, Olds & Lowe, P.C.

(57) ABSTRACT

A synchronous rectifier controlling module includes a signal-processing unit and a plurality of driving units, the signal-processing unit is coupled with a secondary winding of a power transformer, and the driving units are electrically connected to a plurality of switch groups, each switch group includes a plurality of power switches. The signal-processing unit measures a current flowing through the secondary winding and determined operation mode of each of the power switches. When the current is increased from a first determined level to the second determined level, the synchronous rectifier controlling module makes an amount of the power switches of each of the switch groups turn on and off by following the driving signal increase accordingly.

12 Claims, 7 Drawing Sheets

SYNCHRONOUS RECTIFIER CONTROLLING MODULE AND METHOD FOR CONTROLLING A SYNCHRONOUS RECTIFIER

BACKGROUND OF THE INVENTION

1. Field of the Invention

The present invention relates to a switch-controlling module and a method for controlling switches, and in particular to a synchronous rectifier controlling module and method for controlling a synchronous rectifier on a secondary side of power transformer.

2. Description of Related Art

The conduction loss of diode rectifier assembled by diodes or Schottky diodes contributes significantly to the overall power loss in a power converter (or power supply), especially in low output-voltage applications. The rectifier conduction loss is proportional to the product of its forward-voltage drop, and the forward conduction current. Metal-oxide-semiconductor field-effect transistors (MOSFETs) have advantages of low on-resistance, shorten responsible time, and high input resistance. Under certain current level, the forward-voltage drop of a synchronous rectifier assembled by MOSFETs can be lower than that of a diode rectifier, and consequently reduces the rectifier conduction loss. Hence, the synchronous rectifier is wildly used in power supplies.

Figure 1:
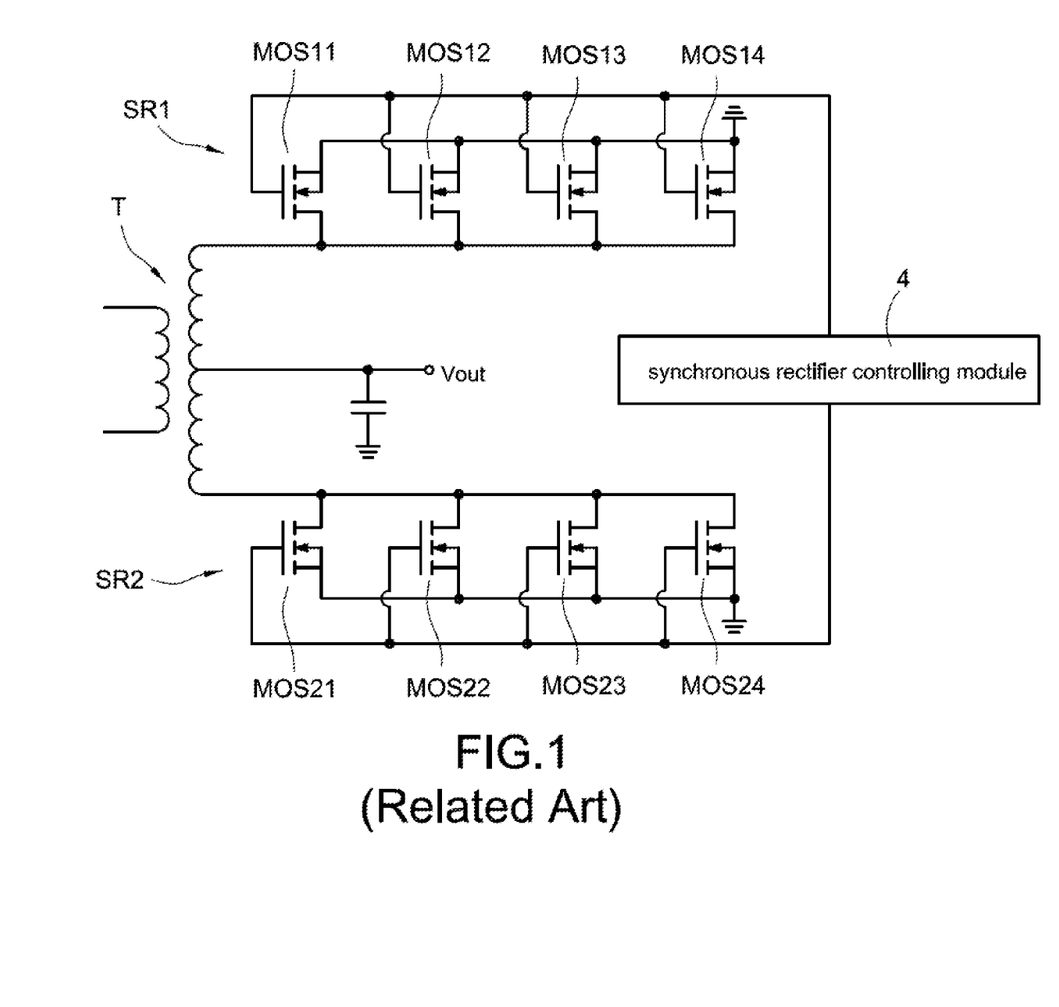
FIG. 1 is a circuit diagram of a conventional synchronous rectifier controlling module.

Reference is made to FIG. 1, which is a circuit diagram of a conventional synchronous rectifier controlling module. The synchronous rectifier controlling module 4 is configured to control a synchronous rectifier on a secondary side of a power transformer T of a power converter (such as DC-to-DC power converter configured to convert a DC voltage into another DC voltage). The synchronous rectifier includes a first switch group SR1 and a second switch group SR2. As shown in FIG. 1, the first switch group SR1 includes four power switches MOS11, MOS12, MOS 13, and MOS14 electrically connected in parallel, and the second switch group SR2 includes four power switches MOS21, MOS22, MOS23, and MOS24 electrically connected in parallel. In particular, gates of each of the power switches MOS11~MOS24 are electrically connected to the synchronous rectifier controlling module 4, drains thereof are electrically connected to a secondary winding of the power converter T, and sources thereof are electrically connected to ground.

In this manner, the synchronous rectifier controlling module 4 can control operating modes of the power switches MOS11~MOS24. For example, all of the power switches MOS11~MOS24 can be controlled to be always turned off when the synchronous rectifier controlling module 4 outputs a driving signal with continuously low voltage level lower than the gate threshold level of each of the power switches MOS11~MOS24. In addition, the power switches MOS11~MOS24 can be controlled to be turn on and off by following a waveform of a signal switching between two voltage levels outputted from the synchronous rectifier controlling module 4. In particular, the two voltage level mentioned above can be a high voltage level higher than or equal to a gate threshold level of each of the power switches MOS11~MOS24 and a low voltage level lower than the gate threshold level each of the power switches MOS11~MOS24.

The synchronous rectifier controlling module 4 is easily controlled and compact, however, whether the power converter is operated under light-load or heavy-load, all of the power switches MOS11~MOS24 are simultaneously turned on and off by following the waveform of the driving signal outputted from the synchronous rectifier controlling module 4, which increasing the conduction loss of power converter.

SUMMARY OF THE INVENTION

According to one aspect of the present invention, a synchronous rectifier controlling module configured to control a synchronous rectifier electrically connected to a secondary winding of a power transformer, the synchronous rectifier comprising a plurality of switch groups, and each of the switch groups comprising a plurality of power switches. The synchronous rectifier controlling module includes a signal-processing unit and a plurality of driving units. The signal-processing unit is electrically connected to the secondary winding for measuring a current flowing through the secondary winding and determining operation modes of the power switches of each of the switch groups. The driving units are electrically connected to the power switches of each of the switch groups and the signal-processing unit. When the current is smaller than a first determined level, the synchronous rectifier controlling module makes one power switch of each switch groups turn on and off by following a waveform of a driving signal outputted from each driving unit, when the current is larger than a second determined level, the synchronous rectifier controlling module makes all of the power switches of each of the switch groups turn on and off by following the waveform of the driving signal, and when the current is increased from the first determined level to the second determined level, the synchronous rectifier controlling module makes an amount of the power switches of each of the switch groups turn on and off by following the driving signal increase accordingly.

According to another aspect of the present disclosure, a method for controlling a synchronous rectifier electrically connected to a secondary winding of a power transformer comprising a plurality of switch groups, each switch group comprising a plurality of power switches, the method comprising the following steps: (a) measuring a current flowing through the secondary winding of the power converter; and (b) determining the current level for the power converter and controlling the operating mode of the power switches of each of the switch groups, and when the current is between a first determined level and a second determined level, increasing an amount of the power switches of each of the switch groups turning on and off by following the driving signal increasing accordingly.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 2:
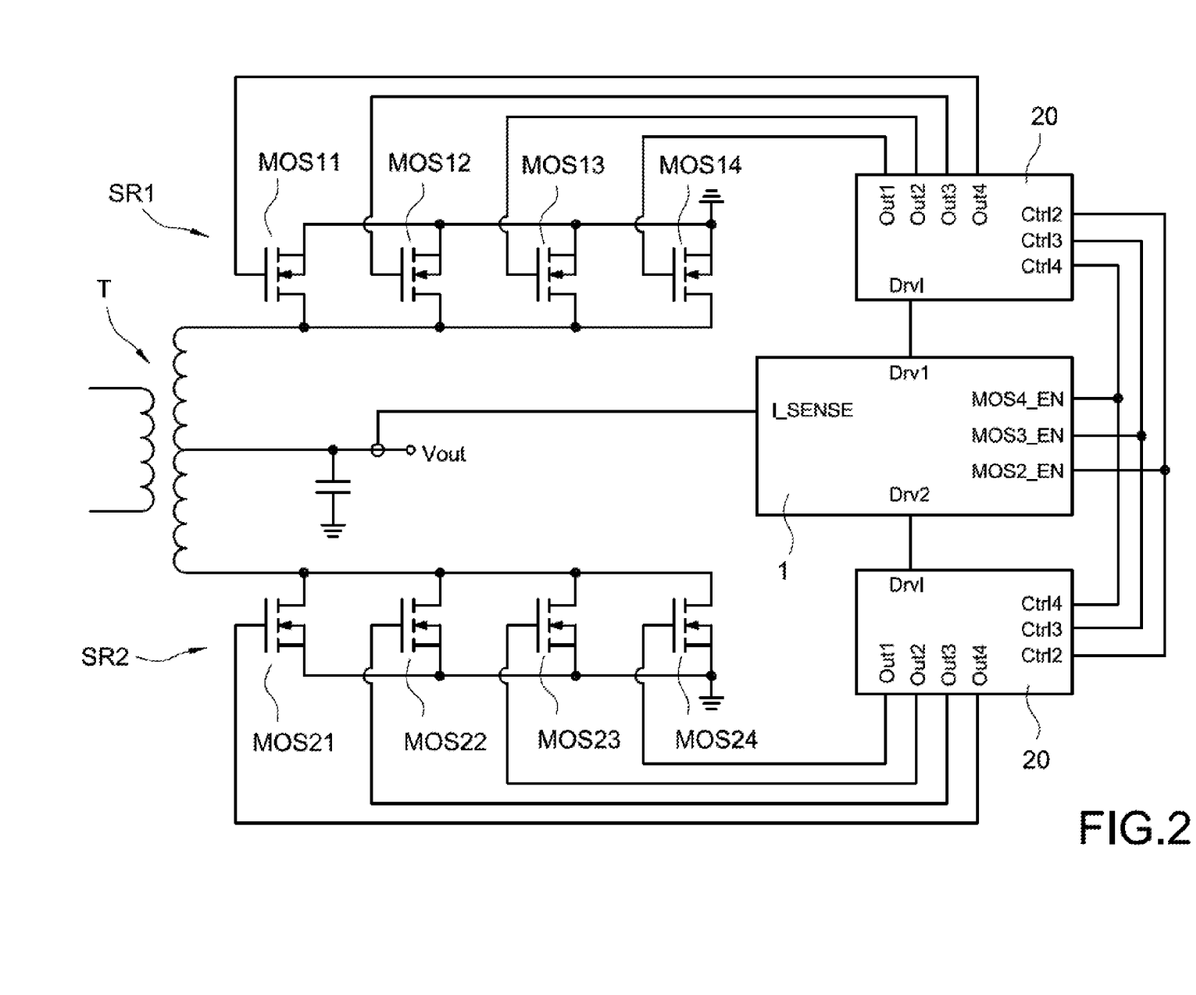
FIG. 2 is a circuit diagram of a synchronous rectifier controlling module according to the present disclosure.

Reference is made to FIG. 2, which is a circuit diagram of a synchronous rectifier controlling module according to the present disclosure. The synchronous rectifier controlling module is configured to control a synchronous rectifier on a secondary side of a power transformer T of a power convertor. The synchronous rectifier is electrically connected to a secondary winding the power transformer T and includes a plurality of switch groups, and each of the switch groups SR1 and SR2 includes a plurality of power switches. As shown in FIG. 2, the synchronous rectifier includes two switch groups SR1 and SR2, the switch group SR1 includes four power switches MOS11, MOS12, MOS 13, and MOS14, and the switch group SR2 includes four power switches MOS21, MOS22, MOS23, and MOS24. The power switches MOS11~MOS24 can be metal-oxide-semiconductor field-effect transistors (MOSFETs) having a relative low on-resistance (about 1 mΩ to about 50 mΩ). A drain of each of the power switches MOS11~MOS24 is electrically connected to the secondary winding of the power transformer T, and a source thereof is connected to ground.

The synchronous rectifier controlling module includes a signal-processing unit 1 and a plurality of driving units 20, and the signal-processing unit 1 is coupled with the secondary winding of the power transformer T for measuring a current of the secondary winding. In particular, the signal-processing unit 1 can measure the current flowing through the secondary winding by current transformer indirectly, or shunt resistor electrically connected to the secondary winding in series directly.

The signal-processing unit 1 includes a current-sensing terminal I_SENSE, a plurality of driving-signal outputting terminals, and a plurality of controlling-signal outputting terminals. In this present disclosure, the signal-processing unit 1 includes two driving-signal outputting terminals and three controlling-signal outputting terminals, the driving-signal outputting terminals are respectively a first driving-signal outputting terminal Drv1 and a second driving-signal outputting terminal Drv2, and the controlling-signal outputting terminals are respectively a first controlling-signal outputting terminal MOS2_EN, a second controlling-signal outputting terminal MOS3_EN, and a third controlling-signal outputting terminal MOS4_EN.

Each driving unit 20 includes a driving-signal inputting terminal DrvI, a plurality of controlling-signal inputting terminals, and a plurality of outputting terminals, and when an amount of the controlling-signal inputting terminal is P, an amount of the outputting terminal is Q, the following condition is satisfied: P=Q−1. In this present disclosure, each driving unit 20 includes three controlling-signal inputting terminals and four outputting terminals, the controlling-signal inputting terminals are respectively a first controlling-signal inputting terminal Cntl2, a second controlling-signal inputting terminal Cntl3, and a third controlling-signal inputting terminal Cntl4, and the outputting terminals are respectively a first outputting terminal Out1, a second outputting terminal Out2, a third outputting terminal Out3, and a fourth outputting terminal Out4.

The first driving-signal outputting terminal Drv1 is electrically connected to the driving-signal inputting terminal DrvI of one of the driving units 20, and the second driving-signal outputting terminal Drv2 is electrically connected to the driving-signal inputting terminal DrvI of the other driving unit 20. The first controlling-signal outputting terminal MOS2_EN of the signal-processing unit 1 is electrically connected to the first controlling-signal inputting terminals Cntl2 of the driving units 20, the second controlling-signal outputting terminal MOS3_EN of the signal-processing unit 1 is electrically connected to the second controlling-signal inputting terminals Cntl3 of the driving units 20, and the third controlling-signal outputting terminal MOS4_EN is electrically connected to the third controlling-signal inputting terminals Cntl4 of the driving units 20.

The first outputting terminal Out1, the second outputting terminal Out2, the third outputting terminal Out3, and the fourth outputting terminal Out4 of each of the driving units 20 are electrically connected to gates of the power switches MOS11~MOS24 respectively. In particular, the first outputting terminal Out1, the second outputting terminal Out2, the third outputting terminal Out3, and the fourth outputting terminal Out4 of the upper driving unit 20 shown in FIG. 2 are electrically connected to the gates of the power switches MOS11, MOS12, MOS13, and MOS14 respectively, and the first outputting terminal Out1, the second outputting terminal Out2, the third outputting terminal Out3, and the fourth outputting terminal Out4 of the lower driving unit 20 shown in FIG. 2 are electrically connected to the gates of the power switches MOS21, MOS22, MOS23, and MOS24 respectively.

The current-sensing terminal I_SENSE of the signal-processing unit 1 is electrically connected to the secondary winding of the power transformer T, such that the signal-processing unit 1 can measure the current flowing through the secondary winding of the power transformer T. After that, the signal-processing unit 1 can determine operating modes of each of the power switches MOS11~MOS24 according to the current flowing through the secondary winding by outputting controlling signals to the first controlling-signal inputting terminals Cntl2, the second controlling-signal inputting terminals Cntl3, and the third controlling-signal inputting terminals Cntl4 from the first controlling-signal outputting terminal MOS_2EN, the second controlling-signal outputting terminal MOS3_EN, and the third controlling-signal outputting terminal MOS4_EN, respectively. In the other words, the synchronous rectifier controlling module of the present disclosure can determine an amount of the power switches operating in an off-mode according to the current flowing through the secondary winding of the power converter T.

Each of the power switches MOS11~MOS24 can be operated in an off-mode or a following-mode. The power switch MOS11~MOS24 is always turned off when receives a driving signal with continually low voltage level lower than a gate threshold level of power switch MOS11~MOS24, thus the power switch MOS11~MOS24 is operated in the off-mode. In the following-mode, the power switch MOS11~MOS24 is turned on and off by following the waveform of another driving signal that switches between two voltage levels, for example, a high voltage level higher than or equal to a gate threshold level of power switch and a low voltage level lower than the gate threshold level of power switch.

Figure 3:
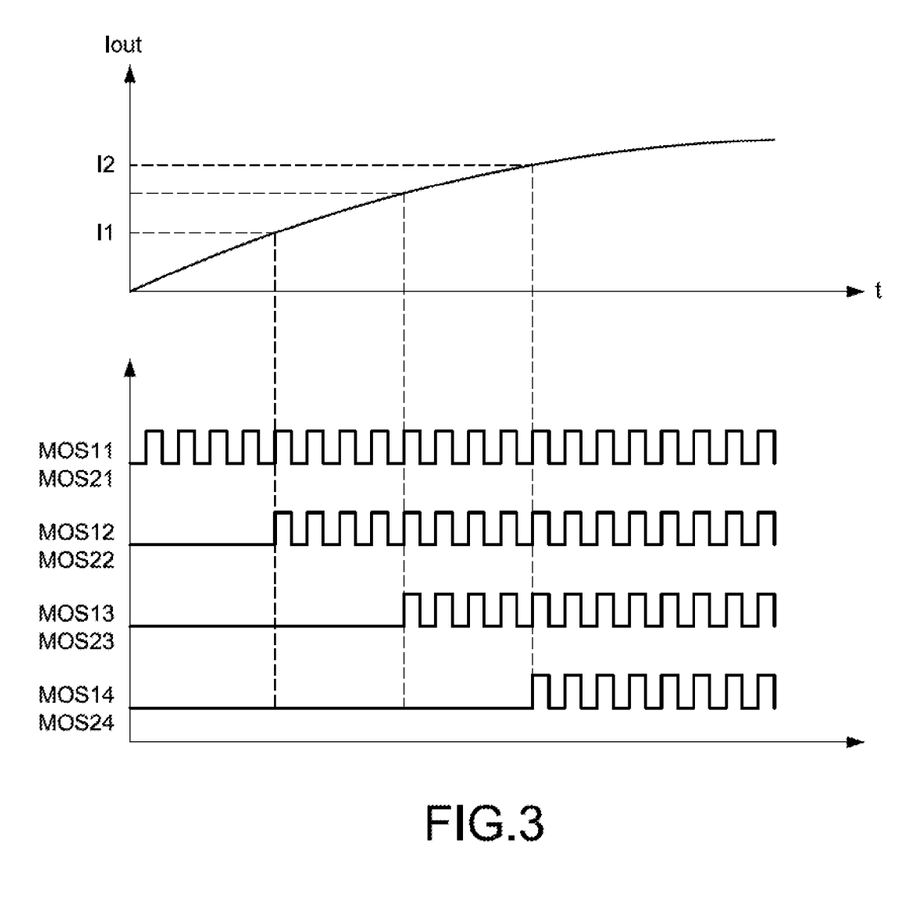
FIG. 3 is a timing chart indicating the operation modes of power switches shown in FIG. 2.

When the current flowing through the secondary winding of the power transformer T is smaller than a first determined level I1 (as shown in FIG. 3), the synchronous rectifier controlling module makes only one of the power switch MOS11~MOS24 of each switch group SR1, SR2, such as power switch MOS11 of the switch group SR1 and MOS 21 of the switch group SR2, operate in the following-mode, and the other power switches MOS12, MOS13, MOS14, MOS22, MOS23, and MOS24 operate in the off-mode. In the other words, when the current flowing through the secondary winding of the power transformer T is smaller than a first determined level I1, the power switches MOS11 and MOS21 does not operate in the off-mode.

When the current flowing through the secondary winding of the power transformer T is larger than a second determined level I2 (as shown in FIG. 3) larger than the first determined level I1, the synchronous rectifier controlling module makes all of the power switches MOS11~MOS24 operated in the following-mode, and the power switches MOS11~MOS24 are turned on and off by following the waveform of the driving signal. In the other words, no power switch is operated in the off-mode when the current flowing through the secondary winding of the power transformer T is larger than a second determined level I2. In particular, the second current I2 is larger than the first current I1, and can be, for example, the half-load current of the power converter having the synchronous rectifier controlling module. The second determined level I2 can be designed as a current of the power converter while the power converter is operated in a half load condition.

When the current flowing through the secondary winding of the power transformer T is increased from the first determined level I1 to the second determined current I2, the synchronous rectifier controlling module makes the amount of the power switches MOS11~MOS24 operate in the following-mode increase accordingly. In particular, an amount of the power switches MOS11~MOS24 operate in the following-mode when the magnitude of current flowing through the secondary winding is close to the second determined level I2 is more than that of is close to the first determined level I1. In short, the amount of the power switches MOS11~MOS24 operating in the following-mode is proportional to the magnitude of the current flow through the secondary winding. Thus the switching loss of the power converter operated in light load condition can be effectively reduced.

The detail operating data of the synchronous rectifier controlling module and the power switches are shown in Table 1.

TABLE 1

| Current | Adjusted according to load electricaly connected to the power converter | | | |
|---|---|---|---|---|
| MOS2_EN | L | H | H | H |
| MOS3_EN | L | L | H | H |
| MOS4_EN | L | L | L | H |
| MOS11 | Follow | Follow | Follow | Follow |
| MOS12 | Off | Follow | Follow | Follow |
| MOS13 | Off | Off | Follow | Follow |
| MOS14 | Off | Off | Off | Follow |
| MOS21 | Follow | Follow | Follow | Follow |
| MOS22 | Off | Follow | Follow | Follow |
| MOS23 | Off | Off | Follow | Follow |
| MOS24 | Off | Off | Off | Follow |

In Table 1, Current represents the current flowing through the second winding of the power transformer T, L represents the signal with low voltage level outputted therefrom and H represents the signal with high voltage level outputted therefrom. Off represents the power switch is operated in the off-mode, and Follow represents the power switch is operated in the following-mode and the power switch is turned on and off by following the waveform of the driving signal.

The synchronous rectifier controlling module of the present disclosure measures the current flowing through the secondary winding of the power transformer T, and controls operating modes of each of the power switches MOS11 to MOS24 according to the magnitude of current. More particular, when the magnitude of current is increased from the first determined level I1 to the second determined level I2, the synchronous rectifier controlling module makes the amount of the power switches MOS11~MOS24 of each of the switch groups SR1 and SR2 operate in the following-mode increase accordingly.

Figure 4A:
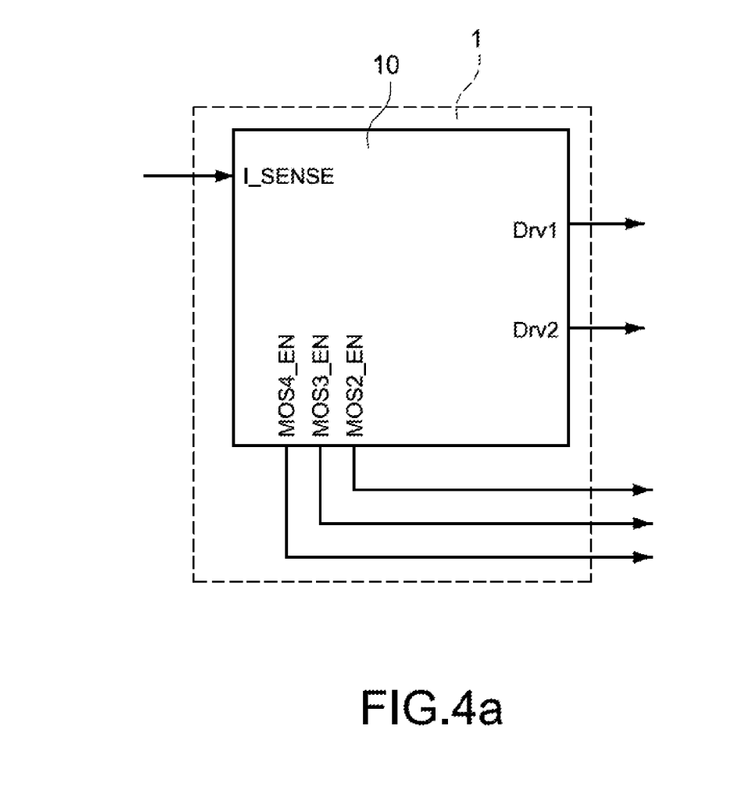
FIG. 4a is a schematic diagram of a signal-processing unit of the present disclosure.

Reference is made to FIG. 4a, which is a schematic diagram of a signal-processing unit according to the present disclosure. The signal-processing unit shown in FIG. 4a includes signal processor 10, the signal processor 10 includes a current-sensing terminal I_SENSE, a first controlling-signal outputting terminal MOS2_EN, a second controlling signal outputting terminal MOS3_EN, a third controlling-signal outputting terminal MOS_4EN, a first driving-signal outputting terminal Drv1, and a second driving-signal outputting terminal Drv2, which are respectively acted as the current-sensing terminal I_SENSE, the first controlling-signal outputting terminal MOS2_EN, the second controlling signal outputting terminal MOS3_EN, the third controlling-signal outputting terminal MOS_4EN, the first driving-signal outputting terminal Drv1, and the second driving-signal outputting terminal Drv2 of the signal-processing unit 1 of the signal-processing unit 1.

Figure 4B:
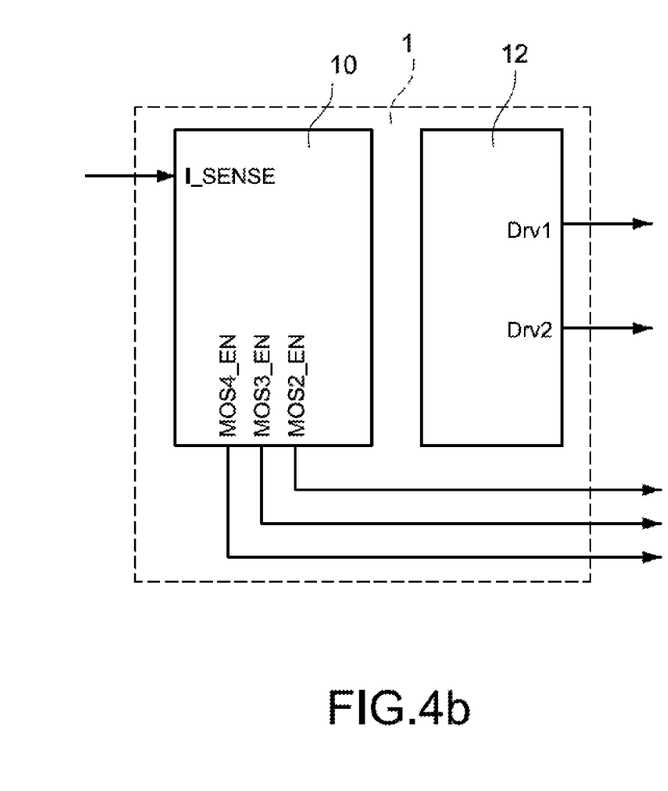
FIG. 4b is another schematic diagram of a signal-processing unit according to a second embodiment of the present disclosure.

Reference is made to FIG. 4b, which is another schematic diagram of a signal-processing unit according to the present disclosure. The signal-processing unit shown in FIG. 4b includes a signal processor 10 and the pulse width modulation (PWM) controller 12. The signal processor 10 includes a current-sensing terminal I_SENSE, a first controlling-signal outputting terminal MOS2_EN, a second controlling signal outputting terminal MOS3_EN, and a third controlling-signal outputting terminal MOS_4EN, and which are respectively acted as the current-sensing terminal I_SENSE, the first controlling-signal outputting terminal MOS2_EN, the second controlling signal outputting terminal MOS3_EN, and the third controlling-signal outputting terminal MOS_4EN of the signal-processing unit 1.

The PWM controller 12 includes a first driving-signal outputting terminal Drv1, and a second driving-signal outputting terminal Drv2, which are respectively acted as the first driving-signal outputting terminal Drv1, and the second driving-signal outputting terminal Drv2 of the signal-processing unit 1.

Figure 4C:
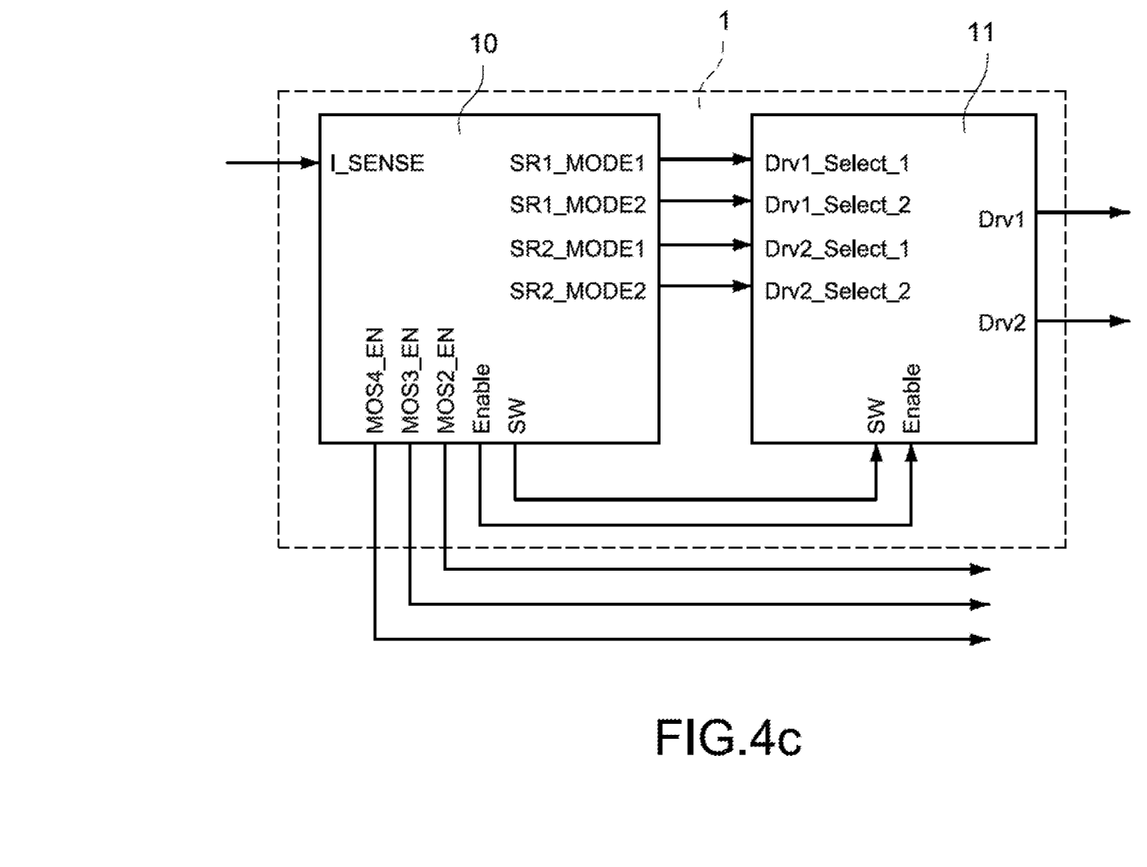
FIG. 4c is further another schematic diagram of a signal-processing unit according to the present disclosure.

Reference is made to FIG. 4c, which is further another schematic diagram of a signal-processing unit according to the present disclosure. The signal-processing unit shown in FIG. 4c includes signal processor 10 and a switch-over component 11, the signal processor 10 includes a current-sensing terminal I_SENSE, a first controlling-signal outputting terminal MOS2_EN, a second controlling signal outputting terminal MOS3_EN, and a third controlling-signal outputting terminal MOS_4EN, which are respectively acted as the current-sensing terminal I_SENSE, the first controlling-signal outputting terminal MOS2_EN, the second controlling signal outputting terminal MOS3_EN, and the third controlling-signal outputting terminal MOS_4EN of the signal-processing unit 1. The signal processor 10 further includes an enable terminal Enable, a switch-controlling terminal SW, and a plurality of operating-mode signal-outputting terminals SR1_MODE1~SR2_MODE2.

The switch-over component 11 includes a first driving-signal outputting terminal Drv1, and a second driving-signal outputting terminal Drv2, which respectively act as the first driving-signal outputting terminal Drv1, and the second driving-signal outputting terminal Drv2 of the signal-processing unit 1. The switch-over component 11 further includes an enable terminal Enable, a switch-controlling terminal SW, and a plurality of driving-and-selecting terminals Drv1_Select_1~Drv2_Select_2.

The enable terminal Enable and the switch-controlling terminal SW of the signal processor 10 are electrically connected to the enable terminal Enable and the switch-controlling terminal SW of the switch-over component 11, respectively, thus the signal processor 10 can control the operating modes of the switch-over component 11. The operating-mode signal-outputting terminals SR1_MODE1~SR2_MODE2 of the signal processor 10 are electrically connected to the driving-and-selecting terminals Drv1_Select_1~Drv2_Select_2 of the switch-over component 11, respectively, thus the switch-over component 11 can output driving signals to the power switches MOS11~MOS24 for determining operating modes thereof according the operating-mode signal-outputting terminals SR1_MODE1~SR2_MODE2.

The detail operating data of the synchronous rectifier controlling module and the power switches are shown in Table 2.

Figure 5A:
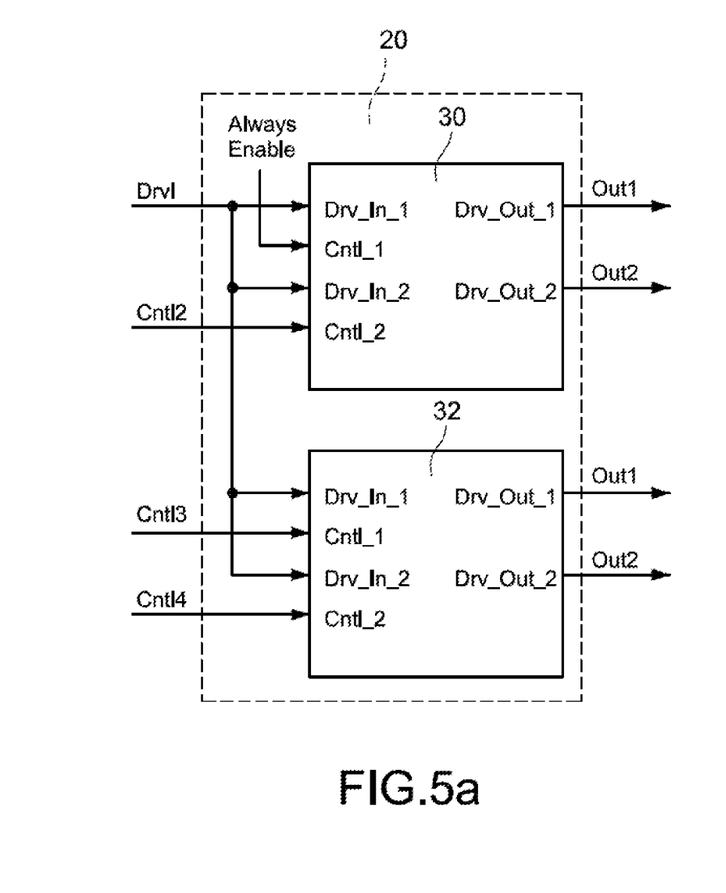
FIG. 5a is a schematic diagram of a driving unit according to the present disclosure.

The second controlling-signal inputting terminal Cntl_2 of the master driver 30 acts as the first controlling-signal inputting terminal Cntl2 of the driving unit 20, the first controlling-signal inputting terminal Cntl_1 of the slave driver 32 acts as the second controlling-signal inputting terminal Cntl3 of the driving unit 20, and the second control-signal inputting terminal Cntl_2 of the slave driver 32 acts as the third controlling-signal inputting terminal Cntl4. The first controlling-signal Cntl_1 of the master driver 30 is electrically connected to an enable signal and always been enable.

The first driving-signal outputting terminal Drv_Out_1 and the second driving-signal outputting terminal Drv_Out_2 of the master driver 30 respectively act as the first outputting terminal Out1 and the second outputting terminal Out2 of the driving unit 20. The first driving-signal outputting terminal Drv_Out_1 and the second driving-signal outputting terminal Drv_Out_2 of the slave driver 32 respectively act as the third outputting terminal Out3 and the fourth outputting terminal Out4 of the driving unit 20.

Figure 5B:
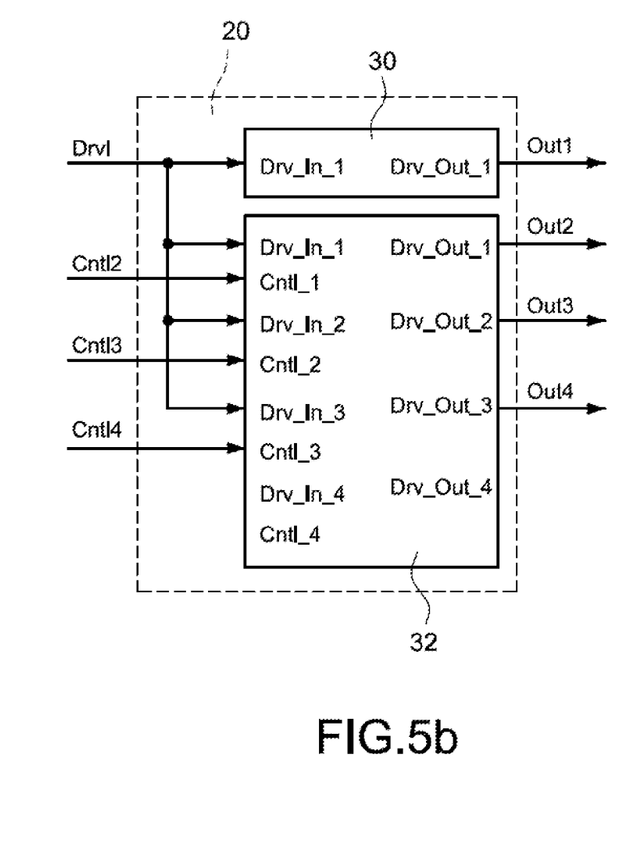
FIG. 5b is another schematic diagram of a driving unit according to the present disclosure.

Reference is made to FIG. 5b, which is another schematic diagram of a driving unit according to the present disclosure. The driving unit shown in FIG. 5b includes a master driver 30 and a slave driver 32, and the master drive 30 and the slave driver 32 respective includes a first driving-signal inputting terminal Drv_In_1 and a first driving-signal outputting terminal Drv_Out_1.

TABLE 2

| Current | Adjusted according to load electrically connected to the power converter | | | | | | | | |
|---|---|---|---|---|---|---|---|---|---|
| Enable  | H   | L      | L      | L      | L      | L      | L      | L      | L      |
| SW      | X   | L      | L      | L      | L      | H      | H      | H      | H      |
| MOS2_EN | X   | L      | H      | H      | H      | L      | H      | H      | H      |
| MOS3_EN | X   | L      | L      | H      | H      | L      | L      | H      | H      |
| MOS4_EN | X   | L      | L      | L      | H      | L      | L      | L      | H      |
| MOS11   | Off | Follow | Follow | Follow | Follow | Follow | Follow | Follow | Follow |
| MOS12   | Off | Off    | Follow | Follow | Follow | Off    | Follow | Follow | Follow |
| MOS13   | Off | Off    | Off    | Follow | Follow | Off    | Off    | Follow | Follow |
| MOS14   | Off | Off    | Off    | Off    | Follow | Off    | Off    | Off    | Follow |
| MOS21   | Off | Follow | Follow | Follow | Follow | Follow | Follow | Follow | Follow |
| MOS22   | Off | Off    | Follow | Follow | Follow | Off    | Follow | Follow | Follow |
| MOS23   | Off | Off    | Off    | Follow | Follow | Off    | Off    | Follow | Follow |
| MOS24   | Off | Off    | Off    | Off    | Follow | Off    | Off    | Off    | Follow |

In Table 2, Current represents the current flowing through the second winding of the power transformer T, X represents the signal with arbitrary voltage level outputted therefrom, L represents the signal with low voltage level outputted therefrom and H represents the signal with high voltage level outputted therefrom. Off represents the power switch is operated in off-mode, and Follow represents the power switch is operated in the following-mode and the power switch is turned on and off by following the waveform of the driving signal.

Reference is made to FIG. 5a, which is a schematic diagram of a driving unit according to the present disclosure. The driving unit 20 shown in FIG. 5a includes a master driver 30 and a slave driver 32, and the master driver 30 and the slave drive 32 respectively includes a first driving-signal inputting terminal Drv_In_1, a second driving-signal inputting terminal Drv_In_2, a first controlling-signal inputting terminal Cntl_1, a second controlling-signal inputting terminal Cntl_2, a first driving-signal outputting terminal Drv_Out_1, and a second driving-signal outputting terminal Drv_Out_2.

The first driving-signal inputting terminals Drv_In_1 and the second driving-signal inputting terminals Drv_In_2 of the master driver 30 and the slave driver 32 are electrically connected to each other, which is acted as the driving-signal inputting terminal DrvI of the driving unit 20.

The slave driver 32 further includes a second driving-signal inputting terminal Drv_In_2, a third driving-signal inputting terminal Drv_In_3, a fourth driving-signal inputting terminal Drv_In_4, a first controlling-signal inputting terminal Cntl_1, a second controlling-signal inputting terminal Cntl_2, a third controlling-signal inputting terminal Cntl_3, a fourth controlling-signal inputting terminal Cntl_4, a second driving-signal outputting terminal Drv_Out_2, a third driving-signal outputting terminal Drv_Out_3, and a fourth driving-signal outputting terminal Drv_Out_4.

The first driving-signal inputting terminal Drv_In_1 of the master driver 30, and the first driving-signal inputting terminal Drv_In_1, the second driving-signal inputting terminal Drv_In_2, and the third driving-signal inputting terminal Drv_In_3 of the slave driver 32 are electrically connected to each other, and acted as the driving-signal inputting terminal Drv1 of the driving unit 20.

The first controlling-signal inputting terminal Cntl_1, the second controlling-signal inputting terminal Cntl_2, and the third controlling-signal inputting terminal Cntl_3 respectively act as the first controlling-signal inputting terminal Cntl2, the second controlling-signal inputting terminal Cntl3, and the third controlling-signal inputting terminal Cntl4 of the driving unit 20.

The first driving-signal outputting terminal Drv_Out_1 of the master driver 30 acts as the first outputting terminal Out1 of the driving unit 20, the first driving-signal outputting terminal Drv_Out_1 of the slave driver 32 acts as the second outputting terminal Out2 of the driving unit 20, the second driving-signal outputting terminal Drv_Out_2 of the slave drive 32 acts as the third outputting terminal Out3 of the driving unit 20, and the fourth driving-signal outputting terminal Drv_Out_3 of the slave drive 32 acts as the fourth outputting terminal Out4 of the driving unit 20.

Figure 5C:
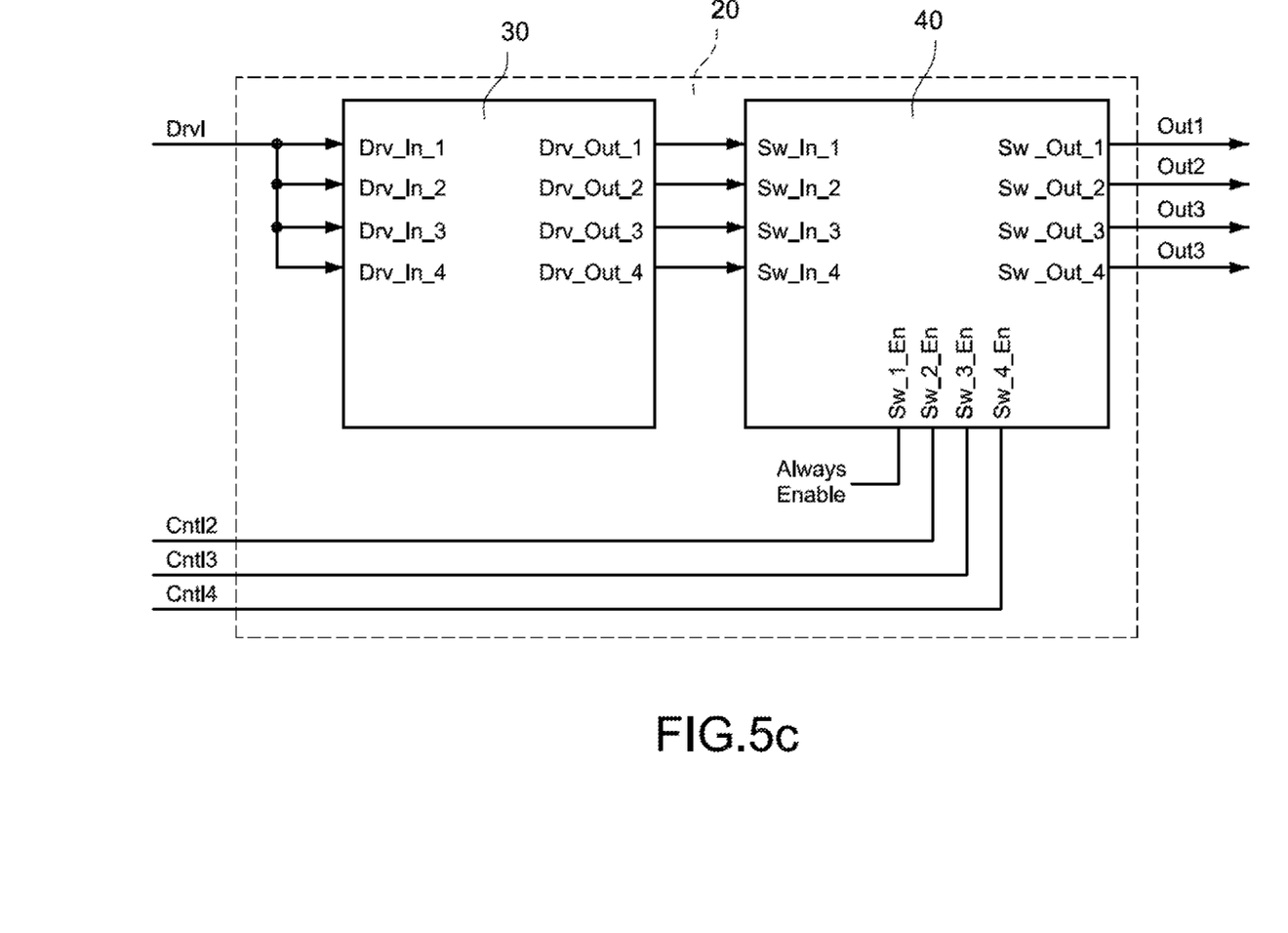
FIG. 5c is further another schematic diagram of a driving unit according to the present disclosure.

FIG. 5c is further another schematic diagram of a driving unit according to the present disclosure. The driving unit 20 shown in FIG. 5c includes a driver 30 and a switching component 40. The driver 30 includes a first driving-signal inputting terminal Drv_In_1, a second driving-signal inputting terminal Drv_In_2, a third driving-signal inputting terminal Drv_In_3, a fourth driving-signal inputting terminal Drv_In_4, a first driving-signal outputting terminal Drv_Out_1, a second driving-signal outputting terminal Drv_Out_2, a third driving-signal outputting terminal Drv_Out_3, and a fourth driving-signal outputting terminal Drv_Out_4.

The first driving-signal inputting terminal Drv_In_1, the second driving-signal inputting terminal Drv_In_2, the third driving-signal inputting terminal Drv_In_3, and the fourth driving-signal inputting terminal Drv_In_4 are electrically connected to each other and acted as the driving-signal inputting terminal DrvI of the driving unit 20.

The switching component 40 includes a first switching-inputting terminal Sw_In_1, a second switching-inputting terminal Sw_In_2, a third switching-inputting terminal Sw_In_3, a fourth switching-inputting terminal Sw_In_4, a first switch-enable terminal Sw_1_En, a second switch-enable terminal Sw_2_En, a third switch-enable terminal Sw_3_En, a fourth switch-enable terminal Sw_4_En, a first switch-outputting terminal Sw_Out_1, a second switch-outputting terminal Sw_Out_2, a third switch-outputting terminal Sw_Out_3, and a fourth switch-outputting terminal Sw_Out_4.

The first switching-inputting terminal Sw_In_1, the second switching-inputting terminal Sw_In_2, the third switching-inputting terminal Sw_In_3, and the fourth switching-inputting terminal Sw_In_4 are electrically connected to the first driving-signal outputting terminal Drv_Out_1, the second driving-signal outputting terminal Drv_Out_2, the third driving-signal outputting terminal Drv_Out_3, and the fourth driving-signal outputting terminal Drv_Out_4, respectively.

The first switch-enable terminal Sw_1_En is electrically connected to an enable signal and always enable. The second switch-enable terminal Sw_2_En, the third switch-enable terminal Sw_3_En, and the fourth switch-enable terminal Sw_4_En respectively act as the first controlling-signal inputting terminal Cntl2, the second controlling-signal inputting terminal Cntl3, and the fourth controlling-signal inputting terminal Cntl4.

The first switch-outputting terminal Sw_Out_1, the second switch-outputting terminal Sw_Out_2, the third switch-outputting terminal Sw_Out_3, and the fourth switch-outputting terminal Sw_Out_4 of the switching component 40 respectively act as the first outputting terminal Out1, the second outputting terminal Out2, the third outputting terminal Out3, and the fourth outputting terminal Out4 of the driving unit 20.

The driving units shown in FIG. 5a to FIG. 5c can be arranged in pair with any signal-processing unit 1 shown in FIG. 4a to FIG. 4c, and the connection of the driving unit and the signal-processing unit is the same as that shown in FIG. 2. The signal-processing unit and the driving unit arranged in pair can control the operating modes of the power switches of each of the switch groups, thus the switching loss of the synchronous rectifier can be effectively reduced.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A synchronous rectifier controlling module configured to control a synchronous rectifier electrically connected to a secondary winding of a power transformer, the synchronous rectifier comprising a plurality of switch groups, and each of the switch groups comprising a plurality of power switches, the synchronous rectifier controlling module comprising:
a signal-processing unit electrically connected to the secondary winding, the signal-processing unit configured to measure a current flowing through the secondary winding and determine operation modes of the power switches of each of the switch groups; and
a plurality of driving units electrically connected to the power switches of each of the switch groups and the signal-processing unit;
wherein when the current is smaller than a first determined level, the synchronous rectifier controlling module makes one power switch of each switch groups turn on and off by following a waveform of a driving signal outputted from each driving unit, when the current is larger than a second determined level, the synchronous rectifier controlling module makes all of the power switches of each of the switch groups turn on and off by following the waveform of the driving signal, and when the current is increased from the first determined level to the second determined level, the synchronous rectifier controlling module makes an amount of the power switches of each of the switch groups turn on and off by following the driving signal increase accordingly.

2. The synchronous rectifier controlling module in claim 1, wherein the signal-processing unit comprises a current-sensing terminal, a plurality of driving-signal outputting terminals, and a plurality of controlling-signal outputting terminals, the current-sensing terminal is coupled with the secondary winding of the power transformer, each driving unit comprises a driving-signal inputting terminal, a plurality of controlling-signal inputting terminals, and a plurality of outputting terminals, the driving-signal outputting terminals of the signal-processing unit are electrically connected to the driving-signal inputting terminals of the driving units, the controlling-signal outputting terminals of the signal-processing unit are electrically connected to controlling-signal inputting terminals of each of the driving units, respectively, and the outputting terminals of each of the driving units are electrically connected to power switches of each of the switch groups.

3. The synchronous rectifier controlling module in claim 2, wherein an amount of the controlling-signal inputting terminals is P, an amount of the outputting terminals is Q, and the following condition is satisfied:

$$P=Q-1.$$

4. The synchronous rectifier controlling module in claim 2, wherein the signal-processing unit comprises a signal processor and a pulse-width-modulating controller, the signal processor comprising the current-sensing terminal and the controlling-signal outputting terminals, and the pulse-width-modulating controller comprising the driving-signal outputting terminals.

5. The synchronous rectifier controlling module in claim 4, wherein each driving unit is assembled with a main driver and a slave driver, and comprises a first controlling-signal inputting terminal, a second controlling-signal inputting terminal, and a third controlling-signal inputting terminal, the main driver and the slave drive respectively comprises a first driving-signal inputting terminal, a second driving-signal inputting terminal, a first controlling-signal inputting terminal, a second controlling-signal inputting terminal, a first driving-signal outputting terminal, and a second driving-signal outputting terminal, the first drive-signal inputting terminals and the second drive-signal inputting terminals of the main driver and the slave driver are electrically connected to each other and acted as the driving-signal inputting terminal of each driving unit, the second controlling-signal inputting terminal of the main drive is acted as the first controlling-signal inputting terminal of each driving unit, the first controlling-signal inputting terminal of the slave drive is acted as the second controlling-signal inputting terminal of each driving unit, and the second controlling-signal inputting terminal of the slave drive is acted as the third controlling-signal inputting terminal of each driving unit.

6. The synchronous rectifier controlling module in claim 4, wherein each driving unit is assembled with a main driver and a slave driver, and comprises a first controlling-signal inputting terminal, a second controlling-signal inputting terminal, and a third controlling-signal inputting terminal, the main driver and the slave drive respectively comprises a first driving-signal inputting terminal and a first driving-signal outputting terminal, the slave driver further comprises a second driving-signal inputting terminal, a third driving-signal inputting terminal, a first controlling-signal inputting terminal, a second controlling-signal inputting terminal, a third controlling-signal inputting terminal, a second driving-signal outputting terminal, and a third driving-signal outputting terminal, the first drive-signal inputting terminals of the main driver and slave driver, the second drive-signal inputting terminal, and the third driving-signal inputting terminal of the slave driver are electrically connected to each other and acted as the driving-signal inputting terminal of each driving unit, the first controlling-signal inputting terminal of the slave drive is acted as the first controlling-signal inputting terminal of each driving unit, the second controlling-signal inputting terminal of the slave drive is acted as the second controlling-signal inputting terminal of each driving unit, and the third controlling-signal inputting terminal of the slave drive is acted as the third controlling-signal inputting terminal of each driving unit.

7. The synchronous rectifier controlling module in claim 4, wherein each driving unit is assembled with a driver and a switching component, and comprises a first controlling-signal inputting terminal, a second controlling-signal inputting terminal, and a third controlling-signal inputting terminal, the main driver comprises a first driving-signal inputting terminal, a second driving-signal inputting terminal, a third driving-signal inputting terminal, a fourth driving-signal inputting terminal, a first driving-signal outputting terminal, a second driving-signal outputting terminal, a third driving-signal outputting terminal, and a fourth driving-signal outputting terminal, the first driving-signal inputting terminal, the second driving-signal inputting terminal, the third driving-signal inputting terminal, and the fourth driving-signal inputting terminal are electrically connected to each other and aced as the driving-signal inputting terminal of each driving unit, the switching component comprises a first switching-inputting terminal, a second switching-inputting terminal, a third switching-inputting terminal, a fourth switching-inputting terminal, a first switch-enable terminal, a second switch-enable terminal, a third switch-enable terminal, a fourth switch-enable terminal, a first switch-outputting terminal, a second switch-outputting terminal, a third switch-outputting terminal, and a fourth switch-outputting terminal, the first to fourth switching-inputting terminals are electrically connected to the first to fourth driving-signal outputting terminals, the second to fourth switch-enable terminals are electrically connected to the second to fourth controlling-signal inputting terminals, and the first to fourth first switch-outputting terminals are acted as the first to fourth outputting terminals of each driving unit.

8. The synchronous rectifier controlling module in claim 2, wherein the signal-processing unit is assembled by a signal processor and a switch-over component, the signal processor comprises the current-sensing terminal, the controlling-signal outputting terminals, an enable terminal, a switch-controlling terminal, and a plurality of operating-mode signal-outputting terminals, the switch-over component comprises an enable terminal, a switch-controlling terminal, and a plurality of driving-and-selecting terminals, the enable terminal and the switch-controlling terminal of the signal-processor is electrically connected to the enable terminal and the switch-controlling terminal of the switch-over component, the of operating-mode signal-outputting terminals are electrically connected to the driving-and-selecting terminals.

9. The synchronous rectifier controlling module in claim 8, wherein each driving unit is assembled with a main driver and a slave driver, and comprises a first controlling-signal inputting terminal, a second controlling-signal inputting terminal, and a third controlling-signal inputting terminal, the main driver and the slave drive respectively comprises a first driving-signal inputting terminal, a second driving-signal inputting terminal, a first controlling-signal inputting terminal, a second controlling-signal inputting terminal, a first driving-signal outputting terminal, and a second driving-signal outputting terminal, the first drive-signal inputting terminals and the second drive-signal inputting terminals of the main driver and the slave driver are electrically connected to each other and acted as the driving-signal inputting terminal of each driving unit, the second controlling-signal inputting terminal of the main drive is acted as the first controlling-signal inputting terminal of each driving unit, the first controlling-signal inputting terminal of the slave drive is acted as the second controlling-signal inputting terminal of each driving unit, and the second controlling-signal inputting terminal of the slave drive is acted as the third controlling-signal inputting terminal of each driving unit.

10. The synchronous rectifier controlling module in claim 8, wherein each driving unit is assembled with a main driver and a slave driver, and comprises a first controlling-signal inputting terminal, a second controlling-signal inputting terminal, and a third controlling-signal inputting terminal, the main driver and the slave drive respectively comprises a first driving-signal inputting terminal and a first driving-signal outputting terminal, the slave driver further comprises a second driving-signal inputting terminal, a third driving-signal inputting terminal, a first controlling-signal inputting terminal, a second controlling-signal inputting terminal, a third controlling-signal inputting terminal, a second driving-signal outputting terminal, and a third driving-signal outputting terminal, the first drive-signal inputting terminals of the main driver and slave driver, the second drive-signal inputting terminal, and the third driving-signal inputting terminal of the slave driver are electrically connected to each other and acted as the driving-signal inputting terminal of each driving unit, the first controlling-signal inputting terminal of the slave drive is acted as the first controlling-signal inputting terminal of each driving unit, the second controlling-signal inputting terminal of the slave drive is acted as the second controlling-signal inputting terminal of each driving unit, and the third controlling-signal inputting terminal of the slave drive is acted as the third controlling-signal inputting terminal of each driving unit.

11. The synchronous rectifier controlling module in claim 8, wherein each driving unit is assembled with a driver and a switching component, and comprises a first controlling-signal inputting terminal, a second controlling-signal inputting terminal, and a third controlling-signal inputting terminal, the main driver comprises a first driving-signal inputting terminal, a second driving-signal inputting terminal, a third driving-signal inputting terminal, a fourth driving-signal inputting terminal, a first driving-signal outputting terminal, a second driving-signal outputting terminal, a third driving-signal outputting terminal, and a fourth driving-signal outputting terminal, the first driving-signal inputting terminal, the second driving-signal inputting terminal, the third driving-signal inputting terminal, and the fourth driving-signal inputting terminal are electrically connected to each other and aced as the driving-signal inputting terminal of each driving unit, the switching component comprises a first switching-inputting terminal, a second switching-inputting terminal, a third switching-inputting terminal, a fourth switching-inputting terminal, a first switch-enable terminal, a second switch-enable terminal, a third switch-enable terminal, a fourth switch-enable terminal, a first switch-outputting terminal, a second switch-outputting terminal, a third switch-outputting terminal, and a fourth switch-outputting terminal, the first to fourth switching-inputting terminals are electrically connected to the first to fourth driving-signal outputting terminals, the second to fourth switch-enable terminals are electrically connected to the second to fourth controlling-signal inputting terminals, and the first to fourth first switch-outputting terminals are acted as the first to fourth outputting terminals of each driving unit.

12. The synchronous rectifier controlling module in claim 1, wherein an amount of the power switches turned on and off by following the waveform of the driving signal is proportional to a magnitude of the current flowing through the secondary winding of the power converter.

* * * * *